(12) United States Patent
Mitamura et al.

(10) Patent No.: US 7,874,741 B2
(45) Date of Patent: Jan. 25, 2011

(54) OPTICAL MODULE AND PROCESS FOR MANUFACTURING THE SAME

(75) Inventors: Kazuhiro Mitamura, Kanagawa (JP); Hideyuki Yamada, Kanagawa (JP)

(73) Assignee: Renesas Electronics Corporation, Kawasaki-shi, Kanagawa (JP)

( * ) Notice: Subject to any disclaimer, the term of this patent is extended or adjusted under 35 U.S.C. 154(b) by 0 days.

(21) Appl. No.: 12/654,924

(22) Filed: Jan. 8, 2010

(65) Prior Publication Data

US 2010/0220955 A1    Sep. 2, 2010

(30) Foreign Application Priority Data

Mar. 2, 2009    (JP) .............................. 2009-022384

(51) Int. Cl.
*G02B 6/36* (2006.01)
(52) U.S. Cl. .............................. 385/93; 385/53; 385/88; 385/92
(58) Field of Classification Search .................. 385/53, 385/88, 92, 93
See application file for complete search history.

(56) References Cited

U.S. PATENT DOCUMENTS

| | | | |
|---|---|---|---|
| 6,432,733 B1 | 8/2002 | Hashizume | |
| 7,160,039 B2 | 1/2007 | Hargia et al. | |
| 7,352,010 B2* | 4/2008 | Yu et al. | ........................ 257/99 |
| 2007/0122089 A1 | 5/2007 | Sato | |
| 2010/0183268 A1* | 7/2010 | Kihara et al. | .................. 385/93 |

FOREIGN PATENT DOCUMENTS

| | | |
|---|---|---|
| JP | 4-243179 | 8/1992 |
| JP | 10-260336 | 9/1998 |
| JP | 11-54849 | 2/1999 |
| JP | 2004-37478 | 2/2004 |
| JP | 2006-323132 | 11/2006 |

\* cited by examiner

*Primary Examiner*—Jennifer Doan
(74) *Attorney, Agent, or Firm*—McGinn IP Law Group, PLLC (57) ABSTRACT

An optical module includes a lens-containing optically-transmissive member and a receptacle. The receptacle includes: an optical connector-inserting section; a fixing section for fixing the member; and an device-installing section for installing a semiconductor device serving as a light emitting device or a light receiving device. The fixing section communicates with the device-installing section. The member includes a main body and a lens. The main body includes a first section and a second section, the first section having a first outer diameter, which is substantially equal to a internal diameter of said fixing section, and said second section having a second outer diameter, which is smaller than the first outer diameter, and at least containing an end of said main body in a side of the device-installing section.

8 Claims, 10 Drawing Sheets

OPTICAL MODULE AND PROCESS FOR MANUFACTURING THE SAME

This application is based on Japanese patent application No. 2009-22,384, the content of which is incorporated hereinto by reference.

BACKGROUND

1. Technical Field

The present invention relates to an optical module and a process for manufacturing thereof.

2. Related Art

Optical modules for coaxial transmission or reception installed in an optical transceiver such as 10 Gb/s small form-factor pluggable (XFP) transceiver and the like are classified to optical modules for telecom (phone-related) applications utilized for communication distance of 10 kilometers (km) to 40 kilometers and optical modules for datacom (data communication) applications utilized for communication distance of 220 meters (m) to 10 km.

Figure 9:
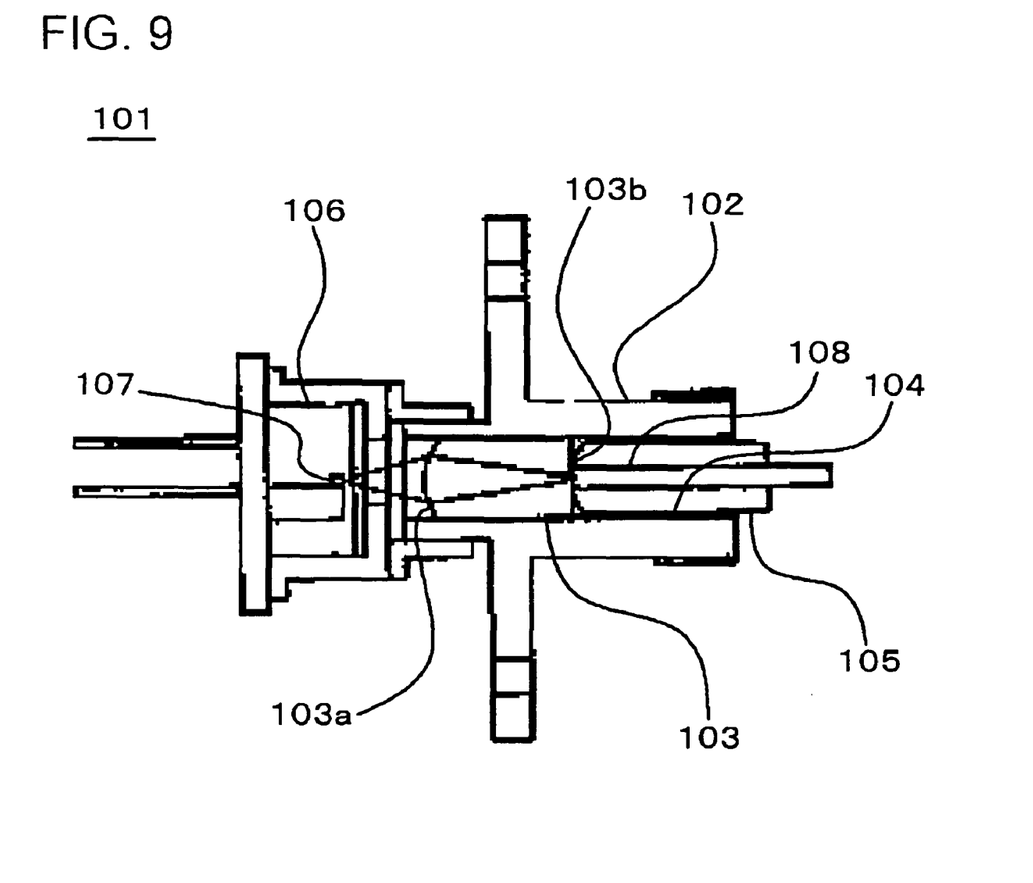
FIG. 9 is a cross-sectional view illustrating optical module of Japanese Patent Laid-Open No. H4-243,179.

Such types of optical modules for coaxial transmission or reception applications are typically disclosed in, for example, Japanese Patent Laid-Open No. H4-243,179 (1992). FIG. 9 is a cross-sectional view, illustrating a configuration of an optical module disclosed in Japanese Patent Laid-Open No. H4-243,179.

As shown in FIG. 9, an optical module 101 disclosed in Japanese Patent Laid-Open No. H4-243,179 includes a receptacle 102 and a glass containing lens 103. One end surface of the glass containing lens 103 is formed in a spherical lens 103a via an optical polishing process or via a molding process, and the other end surface 103b is formed in a flat surface. Such glass containing lens 103 is fixed in the optical connector-insertion hole 104 in the receptacle 102. An optical connector 105 is inserted into optical connector-insertion hole 104 to allow the end surface of the optical connector 105 mating the end surface 103b of the glass containing lens 103. A laser diode (LD) package 106, for example, is fixed to a section in a side of the receptacle 102, which is opposite to the side where the optical connector 105 is inserted, taking the glass containing lens 103 as a reference. Outgoing beam from an LD pellet 107 within the LD package 106 is focused by means of the lens 103a, and is coupled to an optical fiber 108 in the optical connector 105.

An optical reflection loss of, for example, equal to or higher than 27 dB in the synchronous optical Network (SONET) OC-48 is required for the optical module for the telecom application. Thus, it is configured as shown in FIG. 9 that the optical connector 105 mates the glass containing lens 103 to create mutual physical contacts of both elements. The glass containing lens 103 is fixed in the optical connector-insertion hole 104 of the receptacle 102, via an adhesion employing a low-melting glass.

Related prior art documents include:

Japanese Patent Laid-Open No. H4-243,179 (1992);

Japanese Patent Laid-Open No. 2004-37,478;

Japanese Patent Laid-Open No. H10-260,336 (1998);

Japanese Patent Laid-Open No. 2006-323,132;

Japanese Patent Laid-Open No. H11-54,849 (1999); and

U.S. Pat. No. 7,160,039.

In order to reduce the production costs for the receptacle 102 in the configuration of the optical module 101 disclosed in Japanese Patent Laid-Open No. H4-243,179 (1992) (FIG. 9), it is generally desirable to compose the receptacle 102 with a resin. However, if the glass containing lens 103 is fixed to the receptacle 102 with a low-melting glass, the receptacle 102 cannot be composed of a resin, since the melting point of the low-melting glass is around 400 degrees C., and thus the receptacle 102 is required to be composed of a metal or the like.

While an alternative way for fixing the glass containing lens 103 with an adhesive agent instead of the low-melting glass may be considered, the structure described in Japanese Patent Laid-Open No. H4-243,179 may exhibit insufficient bonding strength, due to a difficulty in the injection of or the coating with the adhesive agent. In addition, the optical path length may be disturbed, due to a pollution over the surface of the lens 103a or over the end surface 103b physically contacted with the optical connector 105 with an adhesion of the adhesive agent. It is also pointed out in Japanese Patent Laid-Open No. 2004-37,478 that it is difficult to fix the glass containing lens 103 to the receptacle 102 in the optical module 101 having the structure as described in Japanese Patent Laid-Open No. H4243,179 (FIG. 9).

As described above, it is difficult to allow a lens-containing optically-transmissive member such as the glass containing lens being easily adhered to the receptacle with an adhesive agent.

SUMMARY

According to one aspect of the present invention, there is provided an optical module, comprising: a lens-containing optically-transmissive member; and a receptacle, wherein the receptacle includes: an optical connector-inserting section for inserting an optical connector; a fixing section for fixing the lens-containing optically-transmissive member, in which the lens-containing optically-transmissive member is fixed; and an device-installing section for installing a semiconductor device serving as a light emitting device or a light receiving device; the optical connector-inserting section, the section for fixing the lens-containing optically-transmissive member and the device-installing section being coaxially arranged in this sequence, wherein the fixing section communicates with the device-installing section, wherein the lens-containing optically-transmissive member includes a main body and a lens provided in one end of the main body, and wherein the main body of the lens-containing optically-transmissive member includes a first section and a second section, the first section having a first outer diameter, which is substantially equal to a first internal diameter of the fixing section, and the second section having a second outer diameter, which is smaller than the first outer diameter, and at least containing an end of the main body in a side of the device-installing section.

Since the second outer diameter of the second section of the lens-containing optically-transmissive member is smaller than the first outer diameter of the first section according to the optical module of the above-described configuration, the operation for filling at least a clearance between the second section and the fixing section with an adhesive agent can be easily carried out from the side of the device-installing section. Thus, an easier adhesion of the lens-containing optically-transmissive member to the receptacle with an adhesive agent can be achieved. Therefore, the receptacle can be composed of a resin (instead of a metal having higher melting point), so that the optical module can be manufactured with a reduced cost. Moreover, larger coatable region with an adhesive agent is ensured, as compared with the configuration of FIG. 9, and increased adhesive area between the lens-containing optically-transmissive member and the fixing section is achieved, so that the adhesive strengths therebetween can be enhanced. In addition, the clearance between the second section of the lens-containing optically-transmissive member and the fixing section can be easily coated with an adhesive agent, so that stains with the adhesive agent can be prevented in the lens and the end mating the optical connector in the lens-containing optically-transmissive members. Thus, a possibility of causing a blocking of the optical path length by such stain can be reduced. Moreover, the first outer diameter is substantially equivalent to the first internal diameter of the fixing section, so that an easier alignment of the lens-containing optically-transmissive member within the fixing section can be achieved, and that an unwanted displacement of the lens-containing optically-transmissive member within the fixing section during a cure of the adhesive agent can be preferably inhibited. Thus, deterioration in the optical characteristics by an increased aberration can be reduced.

According to another aspect of the present invention, there is provided a process for manufacturing an optical module, comprising, in this sequence: inserting the lens-containing optically-transmissive member of the aforementioned optical module in the fixing section; and fixing the lens-containing optically-transmissive member by adhering to the fixing section with an adhesive agent.

According to the present invention, the lens-containing optically-transmissive member can be easily adhered to the receptacle by an adhesive agent.

BRIEF DESCRIPTION OF THE DRAWINGS

The above and other objects, advantages and features of the present invention will be more apparent from the following description of certain preferred embodiments taken in conjunction with the accompanying drawings, in which.

DETAILED DESCRIPTION

The invention will be now described herein with reference to illustrative embodiments. Those skilled in the art will recognize that many alternative embodiments can be accomplished using the teachings of the present invention and that the invention is not limited to the embodiments illustrated for explanatory purposed.

Exemplary implementations according to the present invention will be described as follows in reference to the annexed figures.

In all figures, an identical numeral is assigned to an element commonly appeared in the figures, and the detailed description thereof will not be repeated.

First Embodiment

Figure 1:
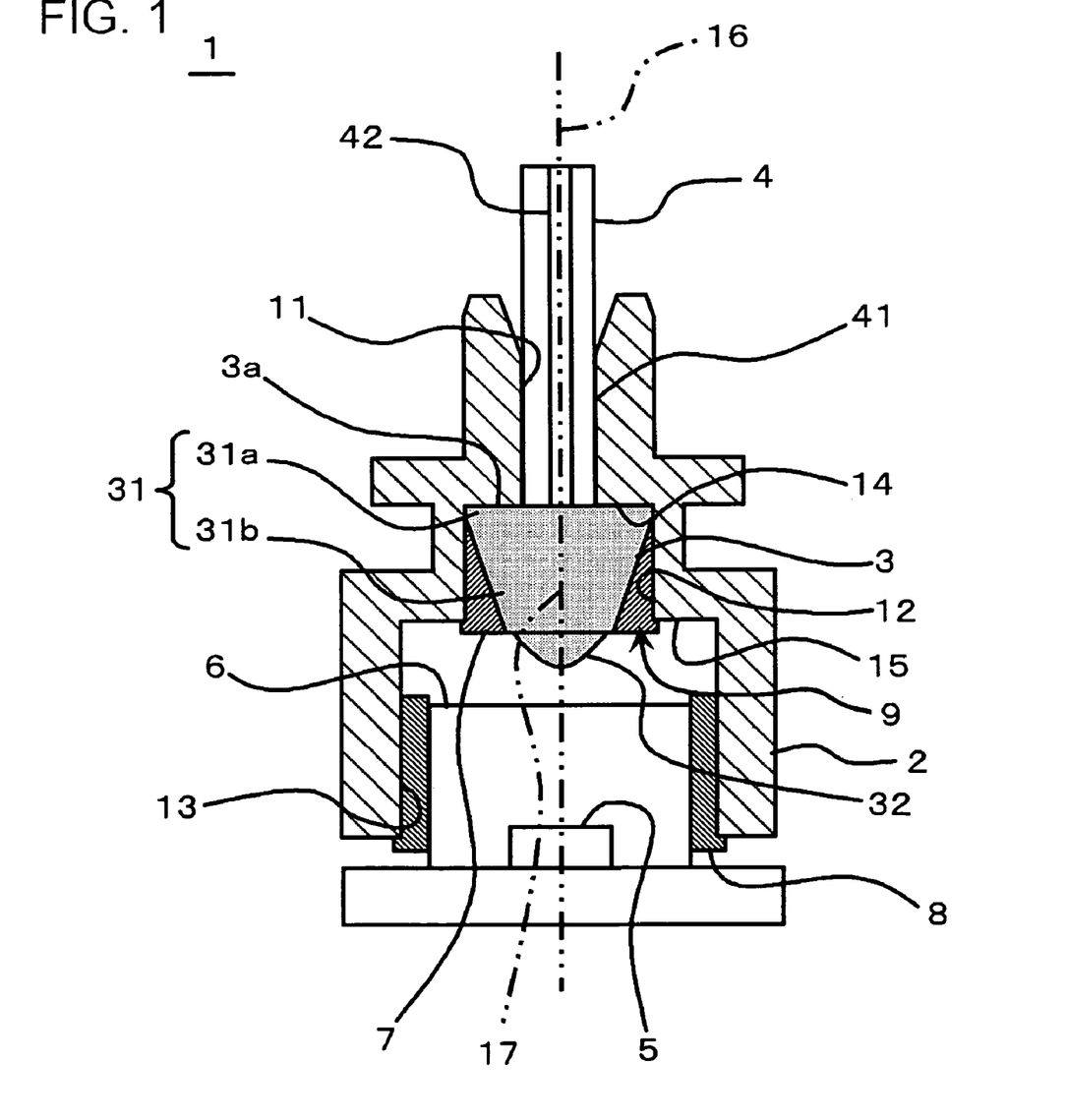
FIG. 1 is a cross-sectional view, illustrating an optical module according to a first embodiment, and in particular, a diagram, illustrating a condition having an optical connector inserted therein.
Figure 2A:
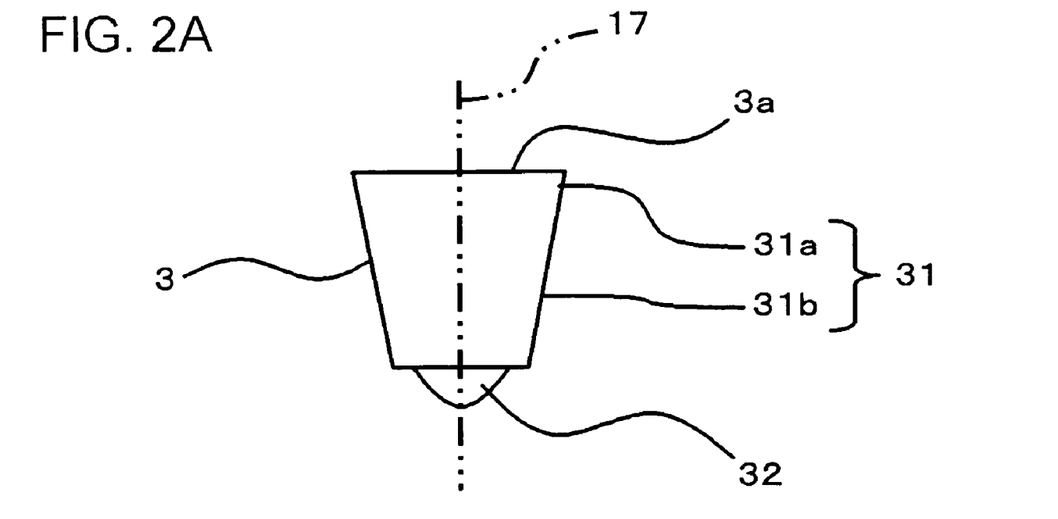
FIG. 2A is a front view of a glass containing lens of the optical module according to the first embodiment.
Figure 2B:
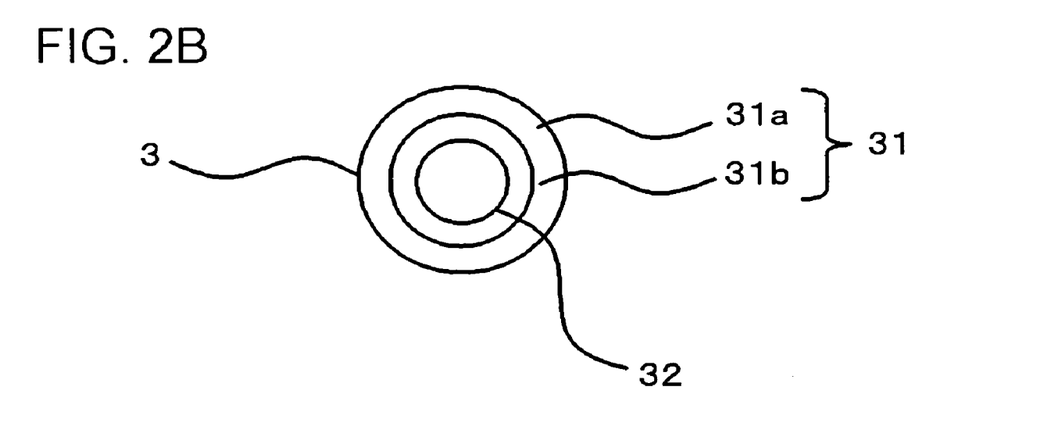
FIG. 2B is a bottom view thereof.
Figure 3:
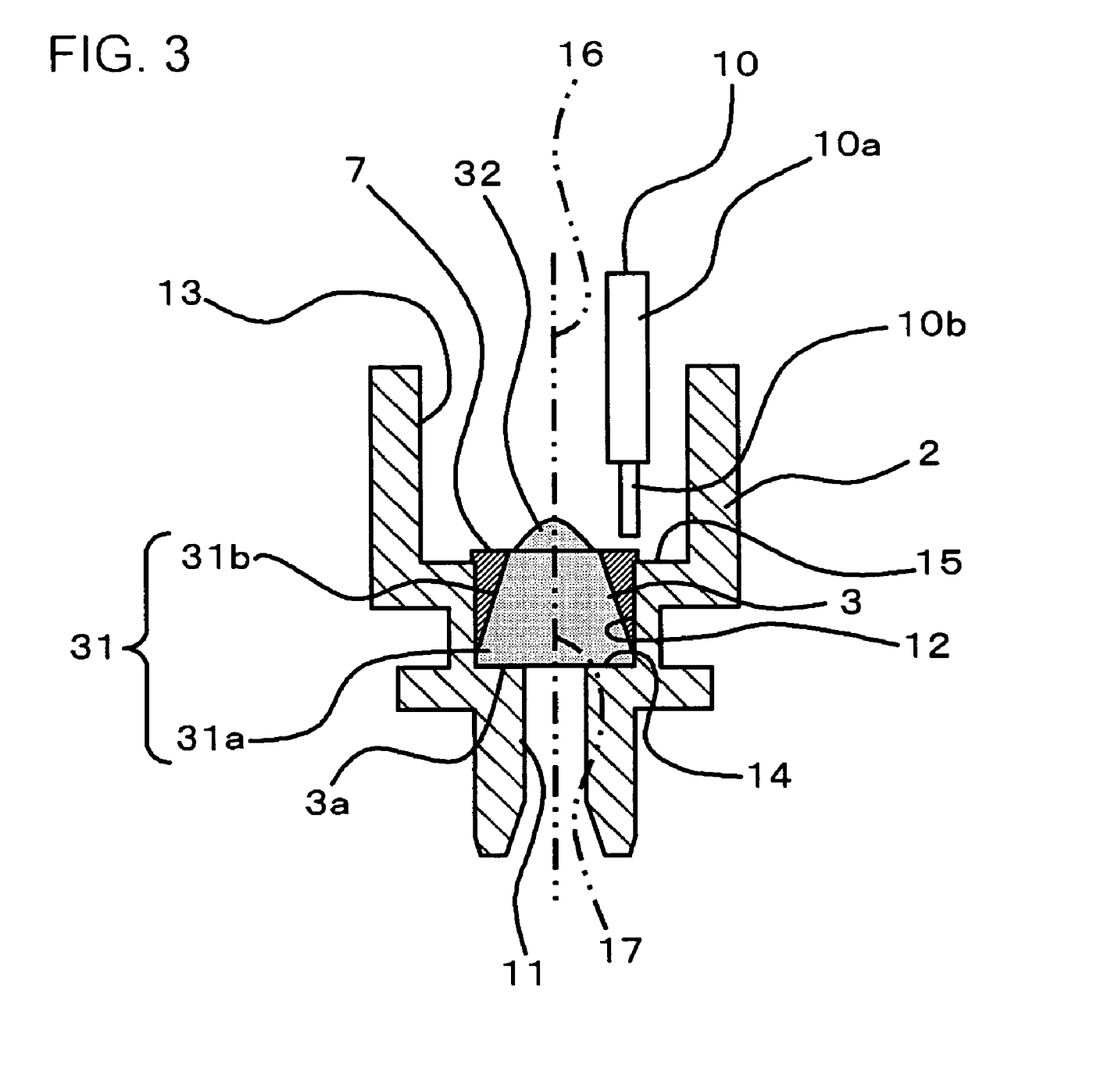
FIG. 3 is a cross-sectional view, illustrating an example of an operation for fixing the glass containing lens to the receptacle of the optical module according to the first embodiment.

FIG. 1 is a cross-sectional view, illustrating a configuration of an optical module 1 according to first embodiment, and in particular, a diagram illustrating a condition having an optical connector 4 inserted therein. FIG. 2A is a front view, illustrating a configuration of a glass containing lens 3 of the optical module 1, and FIG. 2B is a bottom view of the glass containing lens 3 from the underside. FIG. 3 is a cross-sectional view, illustrating an example of an operation for fixing the glass containing lens 3 to the receptacle 2 of the optical module 1.

The optical module 1 according to the present embodiment includes a lens-containing optically-transmissive member (for example, glass containing lens 3) and a receptacle 2. The receptacle 2 includes: an optical connector-inserting section 11, in which the optical connector 4 is inserted; a fixing section for fixing the lens-containing optically-transmissive member (for example, a fixing section 12 for fixing the glass containing lens 3), in which the lens-containing optically-transmissive member is fixed; and an device-installing section 13 for installing a semiconductor device 5 serving as a light emitting device or a light receiving device, all of which are coaxially arranged in this sequence. The fixing section communicates with the device-installing section 13. The lens-containing optically-transmissive member includes a main body 31 and a lens 32 provided in one end of the main body 31. The main body 31 of the lens-containing optically-transmissive member includes a first section (for example, end section 31a) having a first outer diameter, which is substantially equal to a first internal diameter of the fixing section 12, and a second section (for example, sections of the main body 31 except the end section 31a) having a second outer diameter, which is smaller than the first outer diameter, and at least containing an end of the main body 31 in the side of the device-installing section 13. The process for manufacturing of optical module according to the present embodiment involves, in this sequence: inserting the lens-containing optically-transmissive member of the optical module 1 according to the present embodiment in the fixing section; and fixing the lens-containing optically-transmissive member by adhering to the fixing section with an adhesive agent 7. Detailed description will be made as follows.

First of all, the configuration of optical module 1 will be described.

As shown in FIG. 1, the optical module 1 according to the present embodiment is configured to include the receptacle 2 and the glass containing lens 3.

The receptacle 2 includes the optical connector-inserting section 11, the fixing section 12, and the device-installing section 13, coaxially in the arrangement of this order. More specifically, the optical connector-inserting section 11, the fixing section 12 and the device-installing section 13 are arranged in this order along an optical axis 16 of the optical module 1.

The optical connector-inserting section 11 is formed to have a shape of a cylindrical joint, and thus it is possible to insert the optical connector 4 gets in the optical connector-inserting section 11. In addition to above, the optical connector 4 includes a ferrule 41, and an optical fiber 42 is disposed in the ferrule 41.

The fixing section 12 is formed to have a tubular (for example, cylindrical) shape. For example, the fixing section 12 may be designed to have an inner diameter, which is larger than an inner diameter of the optical connector-inserting section 11. The receptacle 2 has a stepwise surface 14 facing the side of the fixing section 12 in a boundary between the fixing section 12 and the optical connector-inserting section 11. This stepwise surface 14 is perpendicular to an optical axis 16. The end surface 3a of the glass containing lens 3 (later description) mates such stepwise surface 14.

The device-installing section 13 is formed to have a tubular (for example, cylindrical) shape. For example, the device-installing section 13 may be designed to have an inner diameter, which is larger than an inner diameter of the fixing section 12, and a stepwise surface 15 is formed in a boundary between the fixing section 12 and the device-installing section 13.

In the internal circumference of this device-installing section 13, a Can package 6 is installed via, for example, an adhesion with an adhesive agent 8. The Can package 6 includes a semiconductor device 5 serving as a light emitting device or a light receiving device. In other words, the semiconductor device 5 serving as a light emitting device or a light receiving device is installed to the device-installing section 13.

The receptacle 2 having such configuration is composed of, for example, a resin. The receptacle 2 is manufactured by, for example, an injection molding process.

The fixing section 12 communicates with the optical connector-inserting section 11, so that the tip of the optical connector 4 mates the end surface 3a of the glass containing lens 3 (as will be described later). The fixing section 12 also communicates with the device-installing section 13, so that the adhesive agent 7 can be applied within the clearance 9 between the glass containing lens 3 and the fixing section 12 from the side of the device-installing section 13 and an optical coupling between the glass containing lens 3 and the semiconductor device 5 can be created.

As shown in FIG. 2A, the glass containing lens 3 is configured to include a main body 31 and a lens 32 provided in one end of the main body 31. The glass containing lens 3 may be manufactured via, for example, an optical polishing process or a molding process.

In case of the present embodiment, the main body 31 of the glass containing lens 3 is formed to have the outer diameter, which is gradually decreased from the upper end toward the bottom end of FIG. 2A. More specifically, for example, the main body 31 is formed to have a tapered shape. More specifically, the shape of the main body 31 is like a partial circular cone, in which the top of a circular cone is cut along the surface that is parallel to the bottom surface of the circular cone to be removed. Therefore, the section of largest diameter in the main body 31 is the end section 31a of the far-off side (in the side of the optical connector-inserting section 11) from the lens 32. The outer diameter of such end section 31a is designed to be substantially equivalent to the inner diameter of the fixing section 12.

The lens 32 is formed to be, for example, a hemisphere shape. As shown in FIG. 2B, the lens 32 is disposed so that the center coincides with the central axis 17 of the glass containing lens 3.

Such glass containing lens 3 is disposed in the interior of the fixing section 12, so that, as shown in FIG. 1, the end surface 3a of the end section 31a mates the stepwise surface 14, and the lens 32 is located in the side of the device-installing section 13. In this condition, the central axis 17 of the glass containing lens 3 coincides with the optical axis 16. The glass containing lens 3 is fixed by being adhered to the inside of the fixing section 12 with the adhesive agent 7.

Assuming that the end section 31a of the main body 31 is referred to as a first section and the sections 31b except the end section 31a in the main body 31 is referred to as a second section, it can be considered that the main body 31 of the glass containing lens 3 includes the first section having the outer diameter, which is substantially equivalent to the inner diameter of the fixing section 12, and the second section having the diameter, which is smaller than the first section, and at least includes a section containing an end section of the main body 31 in the side of the device-installing section 13. Meanwhile, in the configuration of the present embodiment, the first section is an end section of the glass containing lens 3 in the side of the optical connector-inserting section 11. Meanwhile, since the diameter of the main body 31 is gradually decreased from the upper end toward the bottom end as shown in FIG. 2A in the configuration of the present embodiment, it can be considered that the diameter of the glass containing lens 3 is gradually decreased from the first section to the second section.

Next, a process for manufacturing the optical module according to the present embodiment will be described.

First of all, as shown in FIG. 3, the glass containing lens 3 is arranged in the fixing section 12 of the receptacle 2, and the end surface 3a of the glass containing lens 3 is mated with the stepwise surface 14. In such configuration, the glass containing lens 3 is inserted in the fixing section 12 from the side of the device-installing section 13.

Here, the outer diameter of the end section 31a of the glass containing lens 3 is substantially equivalent to the inner diameter of the fixing section 12. Thus, in this way, the glass containing lens 3 is simply inserted in the fixing section 12 and the end surface 3a is simply mated with the stepwise surface 14, so that the glass containing lens 3 is easily positioned in the fixing section 12 so that the central axis 17 of the glass containing lens 3 coincide with the optical axis 16. In addition to above, since the outer diameter of the end section 31a of the glass containing lens 3 is substantially equivalent to the inner diameter of the fixing section 12, the clearance between the end section 31a and the fixing section 12 can be reduced as much as possible.

Next, the glass containing lens 3 is fixed by adhering to the fixing section 12 with the adhesive agent 7.

Such fixing is carried out by, for example, using a tool 10 for applying the adhesive agent shown in FIG. 3. The tool 10 for applying the adhesive agent includes, for example, a reservoir section 10a for retaining an adhesive agent, and a discharging section 10b formed to have a diameter, which is smaller than the reservoir 10a and discharging an adhesive agent from a tip thereof. In addition to above, the diameter of the tip of the discharging section 10b may be preferably, for example, smaller than the clearance 9 between the fixing section 12 and the glass containing lens 3.

As shown in FIG. 3, the reservoir section 10a is pressed so as to, for example, reduce the volume of the reservoir section 10a, while the tip of the discharging section 10b of the tool 10 for applying the adhesive agent is disposed in vicinity of the clearance 9 between the fixing section 12 and the glass containing lens 3. This allows discharging (dropping) the adhesive agent in the reservoir section 10a to the clearance 9 through the discharging section 10b. This allows filling the inside of the clearance 9 with the adhesive agent 7. The adhesive agent 7 is composed of, for example, a thermosetting resin, or, a UV-cure resin. In the former case, the adhesive agent 7 is heated to cure the adhesive agent 7 to adhere the glass containing lens 3 and the fixing section 12. In the latter case, the adhesive agent 7 is exposed to ultraviolet ray to cure the adhesive agent 7 to adhere the glass containing lens 3 and the fixing section 12.

Since the outer diameter of the end section 31a of the glass containing lens 3 is substantially equivalent to the inner diameter of the fixing section 12, an unwanted displacement of the glass containing lens 3 within the fixing section 12 during the cure of the adhesive agent 7 can be preferably inhibited.

Next, the above-described Can package 6 is fixed to the device-installing section 13 with the adhesive agent 8. In addition to above, when the semiconductor device 5 in the Can package 6 is a light emitting device, namely, a laser diode, the optical module 1 serves as an optical module for transmission. On the contrary, when the semiconductor device 5 in the Can package 6 is a light receiving device, the optical module 1 serves as an optical module for reception.

When the Can package 6 is to be fixed in the device-installing section 13, an axial alignment of the receptacle 2 having the glass containing lens 3 fixed thereto and the Can package 6 is conducted as described below. When the optical module 1 is the optical module for transmission, the axial alignment is carried out while receiving a light emitted from the semiconductor device 5 (laser diode) included in the Can package 6 by an optical fiber 42 of the optical connector 4 under the condition that the optical connector 4 is inserted in the optical connector-inserting section 11 as shown in FIG. 1. On the contrary, when the optical module 1 is the optical module for reception, the axial alignment is carried out while receiving a light emitted from the optical fiber 42 of the optical connector 4 by the semiconductor device 5 (light receiving device) included in the Can package 6 under the condition that the optical connector 4 is inserted in the optical connector-inserting section 11 as shown in FIG. 1. After the axial alignment, the optical connector 4 is removed from the device-installing section 13.

The optical module 1 having the structure as shown with FIG. 1 is thus obtained.

According to the first embodiment as described above, the following advantageous effects are obtained.

The optical module 1 according to first embodiment includes, the glass containing lens 3 and the receptacle 2, and the receptacle 2 includes, the optical connector-inserting section 11, in which the optical connector 4 is inserted; the fixing section 12 for fixing the glass containing lens, in which the glass containing lens 3 is fixed; and the device-installing section 13 for installing the semiconductor device 5 serving as a light emitting device or a light receiving device. The optical connector-inserting section 11, the fixing section 12 and the device-installing section 13 being coaxially arranged in this sequence. The fixing section 12 communicates with the device-installing section 13. The glass containing lens 3 includes the main body 31 and the lens 32 provided in one end of the main body 31. The main body 31 of the glass containing lens 3 includes the first section (end section 31a) having the outer diameter, which is substantially equivalent to the inner diameter of the fixing section 12, and the second section (section 31b of the main body 31 except the end section 31a) having the diameter, which is smaller than the first section, and at least includes a section containing an end section of the main body 31 in the side of the device-installing section 13. As described above, since the diameter of the second section of the glass containing lens 3 is smaller than the first section, the operation for filling at least the clearance 9 between the second section and the fixing section 12 with an adhesive agent 7 can be easily carried out from the side of the device-installing section 13. Thus, an easier adhesion of the glass containing lens 3 to the receptacle 2 with an adhesive agent 7 can be achieved. Therefore, the receptacle 2 can be composed of a resin (instead of a metal having higher melting point), so that the optical module 1 can be manufactured with a reduced cost. Moreover, larger coatable region with the adhesive agent 7 is ensured, as compared with the configuration of FIG. 9, and increased adhesive area between the glass containing lens 3 and the fixing section 12 is achieved, so that the adhesive strengths therebetween can be enhanced. In addition, the clearance 9 between the second section of the glass containing lens 3 and the fixing section 12 can be easily coated with an adhesive agent, so that stains with the adhesive agent 7 can be prevented in the lens 32 and the end 3a mating the optical connector 4 in the glass containing lens 3. Thus, a possibility of causing a blocking of the optical path length by such stain can be reduced. Moreover, the outer diameter of a first section (end section 31a) of a glass containing lens 3 is substantially equivalent to the internal diameter of the fixing section 12, so that an easier alignment of the glass containing lens 3 within the fixing section 12 can be achieved, and that an unwanted displacement of the glass containing lens 3 within the fixing section 12 during a cure of the adhesive agent 7 can be preferably inhibited. Thus, deterioration in the optical characteristics by an increased aberration can be reduced.

Further, since the diameter of the glass containing lens 3 is gradually decreased from the first section (end section 31a of the main body 31) to the second section (sections of the main body 31 except the end section 31a), sufficient coatable region with the adhesive agent 7 can be ensured. Thus, sufficient adhesive strength between the glass containing lens 3 and the fixing section 12 can be ensured.

Further, since the first section (end section 31a of the main body 31) is the end section of the glass containing lens 3 in the side of the optical connector-inserting section 11, the coatable region with the adhesive agent 7 can be enlarged as much as possible. Thus, further enhanced adhesive strength between the glass containing lens 3 and the fixing section 12 can be obtained.

Further, the inner diameter of the fixing section 12 is larger than the inner diameter of the optical connector-inserting section 11, and the receptacle 2 includes the stepwise surface 14 in the side thereof facing the fixing section 12 in the boundary between the optical connector-inserting section 11 and the fixing section 12, and the end surface 3a of the glass containing lens 3 is mated with the stepwise surface 14. Thus, the glass containing lens 3 can be easily aligned by simply inserting the glass containing lens 3 in the fixing section 12.

Figure 5A:
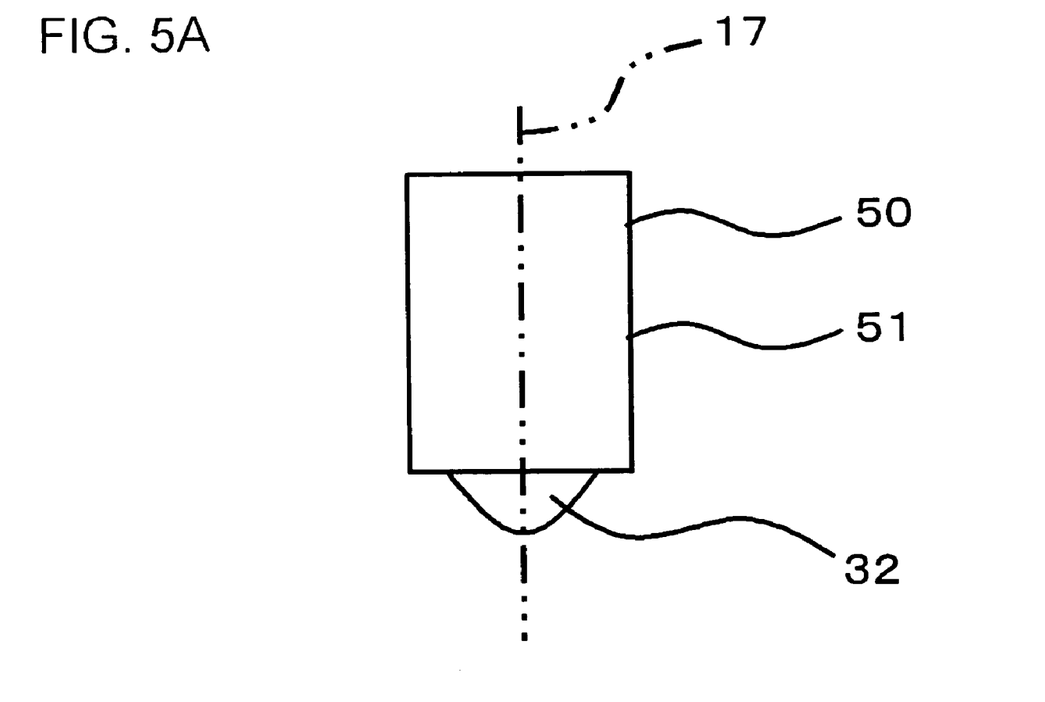
FIG. 5A is a front view of a glass containing lens linearly formed in axis direction.
Figure 5B:
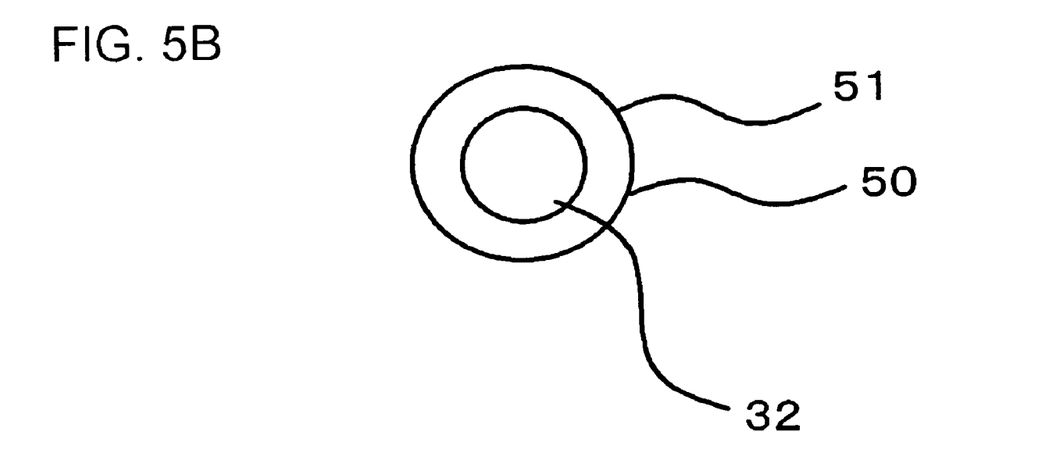
FIG. 5B is a bottom view thereof.

Here, it will be described what types of problems are occurred when the glass containing lens 50, in which the whole main body 51 is cylindrical (diameter is constant), is employed as shown in FIG. 5, in place of the glass containing lens 3 having the above described structure.

Figure 6:
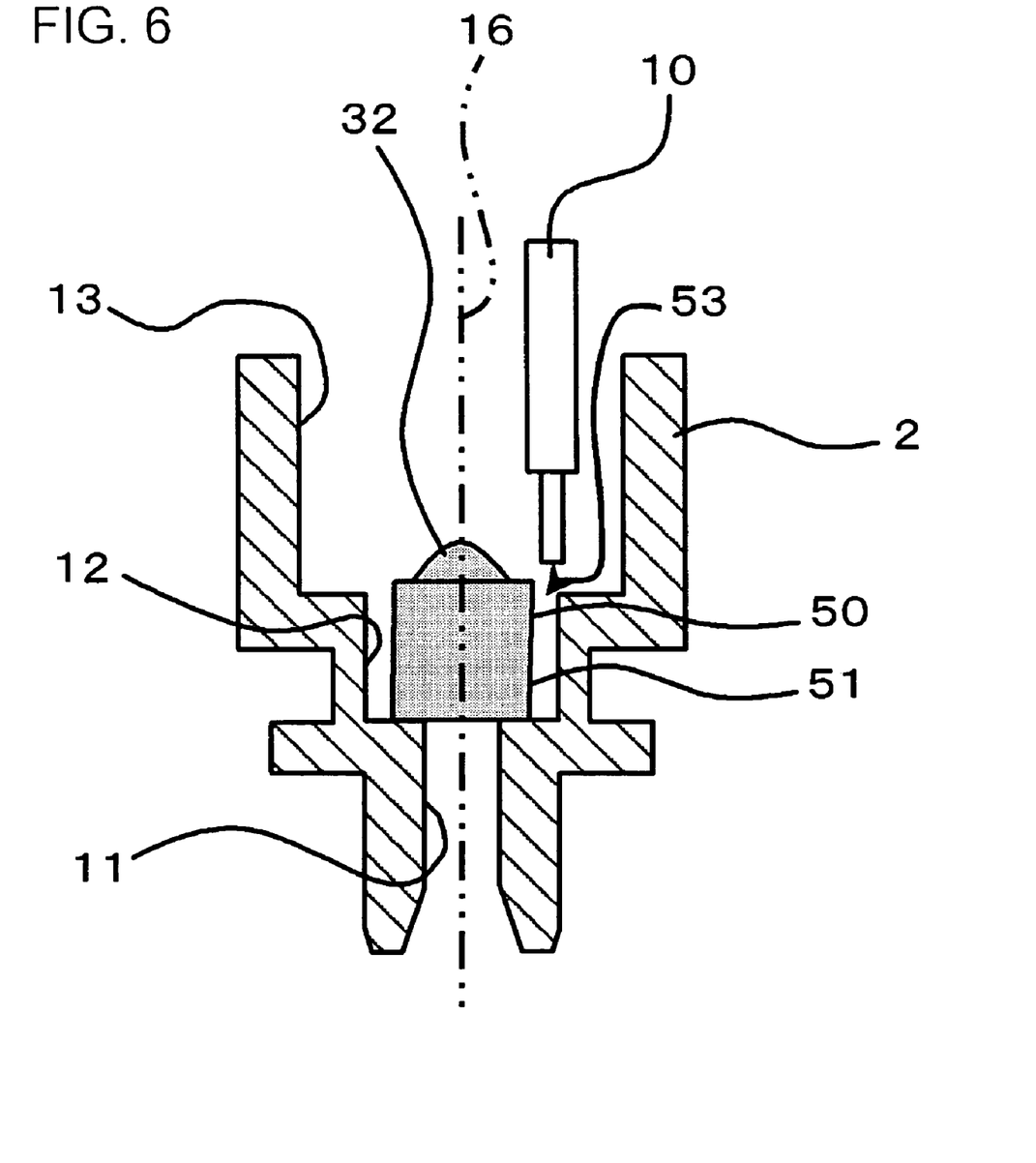
FIG. 6 is a cross-sectional view of the optical module, illustrating an operation for fixing glass containing lens of FIG. 5 in receptacle.

FIG. 6 is a cross-sectional view of an optical module, illustrating an example of an operation for fixing the glass containing lens 50 as shown in FIG. 5 to the receptacle 2.

Figure 7A:
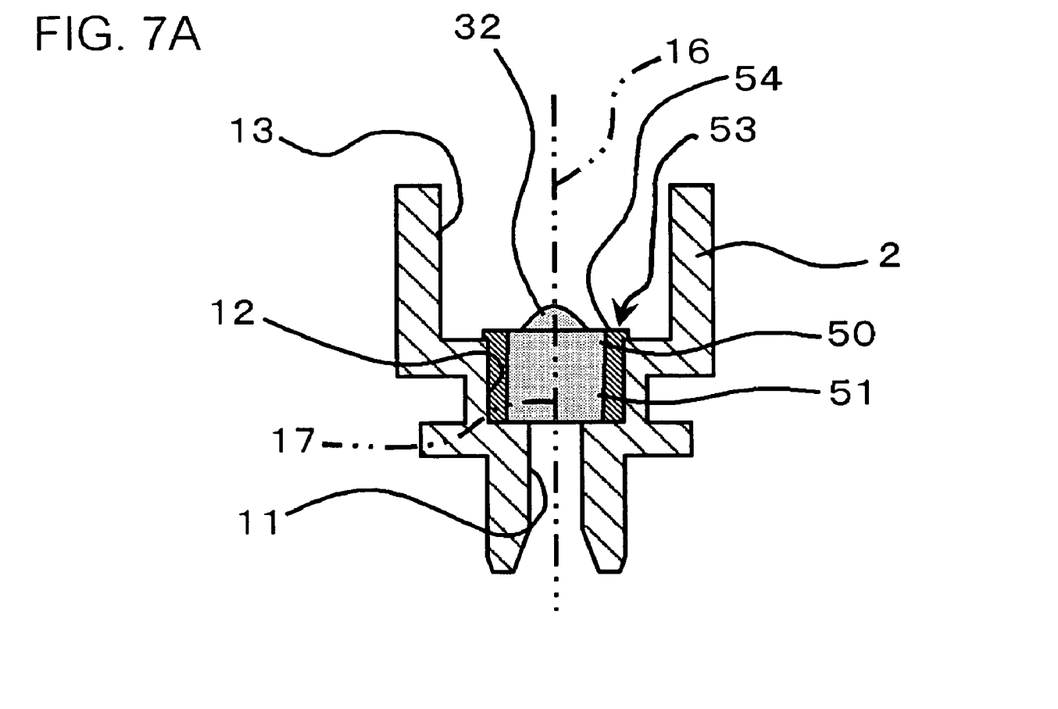
FIG. 7A is a cross-sectional view, illustrating a condition of the glass containing lens shown in FIG. 5A fixed to the center of a fixing section of the receptacle.
Figure 7B:
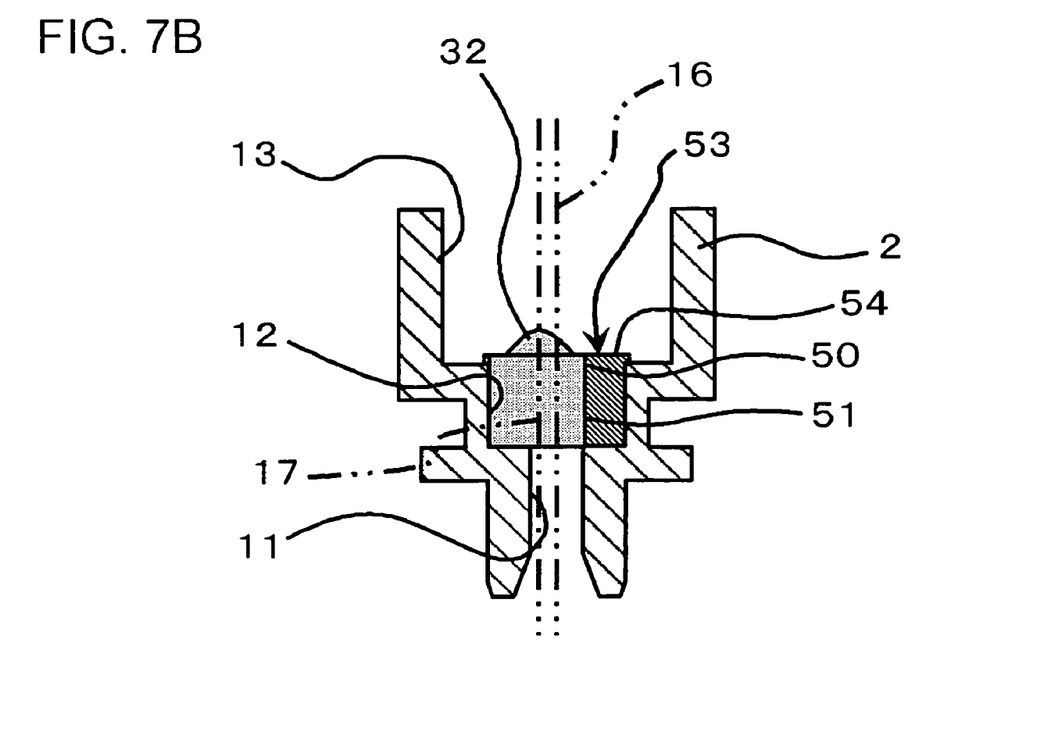
FIG. 7B is a cross-sectional view, illustrating a condition of the glass containing lens shown in FIG. 5A fixed to a section of the fixing section of the receptacle deviated from the center thereof.

When the glass containing lens 50 of FIG. 5 is employed, a possible approach for achieving easier coating with the adhesive agent is to provide a clearance 53 between the glass containing lens 50 and the fixing section 12 as shown in FIG. 6. In such approach, as shown in FIG. 7A, it would be no problem if the glass containing lens 50 is ensured to be adherently fixed to the fixing section 12 with an adhesive agent 54 so as to coincide a central axis 17 of the glass containing lens 50 with an optical axis 16. However, when the glass containing lens 50 is disposed in the fixing section 12 or when the adhesive agent 54 is cured, the central axis 17 of the glass containing lens 50 may be deviated from the optical axis 16 as shown in FIG. 7B. This results in increased aberration, failing to obtain desired optical characteristics.

Figure 8:
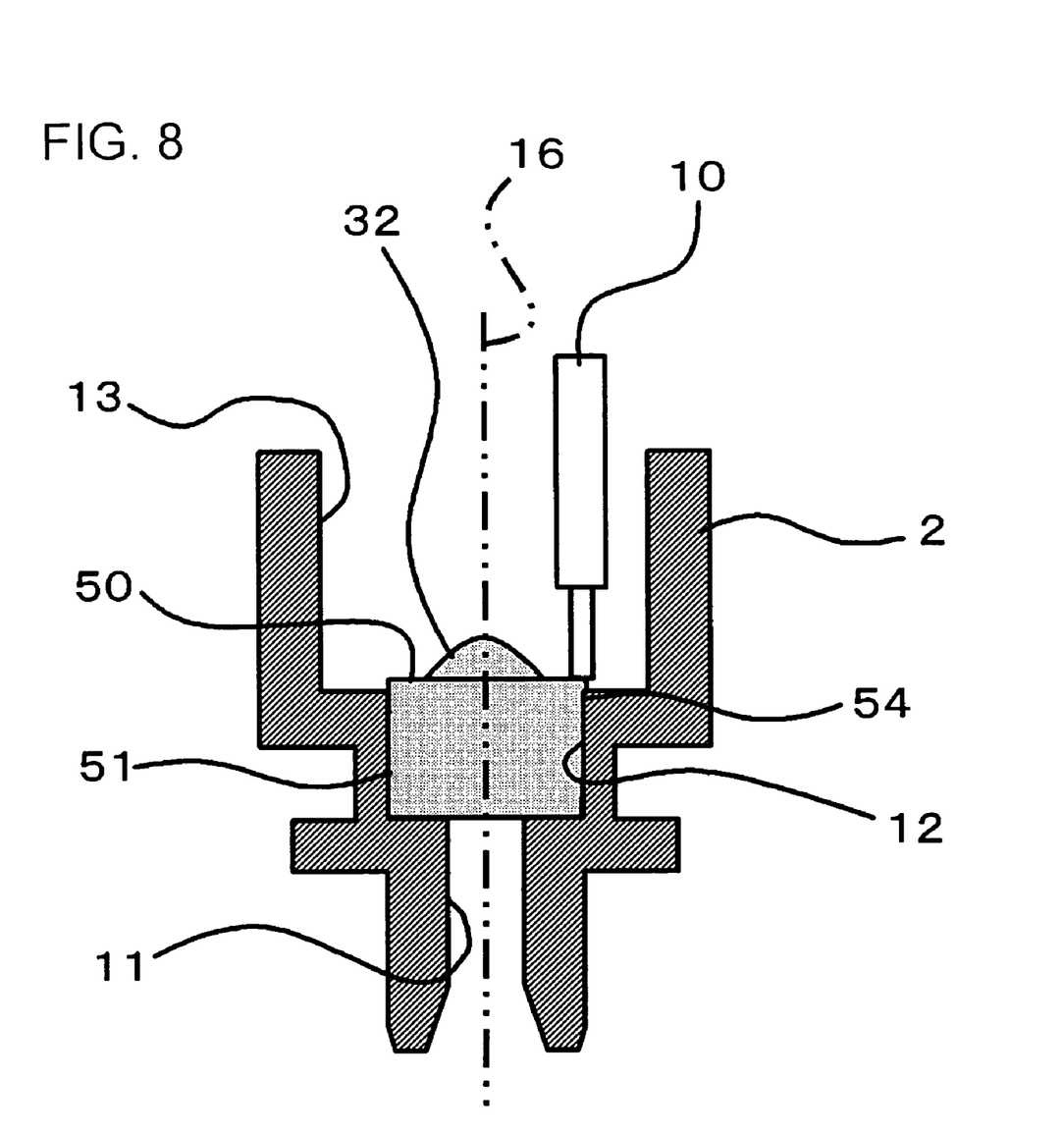
FIG. 8 is a cross-sectional view of an optical module, illustrating an operation for fixing the glass containing lens of FIG. 5 to a fixing section having a diameter, which is substantially equivalent to the diameter of the glass containing lens.

On the other hand, when substantially no clearance is created between the glass containing lens 50 and the fixing section 12 as shown in FIG. 8, the application of the adhesive agent 54 after disposing the glass containing lens 50 in the fixing section 12 allows substantially no penetration of the adhesive agent 54 in such substantially no clearance. Thus, such situation may lead to insufficient adhesive strength between the glass containing lens 50 and the fixing section 12. Besides, when the glass containing lens 50 is disposed in the fixing section 12 after applying the adhesive agent 54 over the fixing section 12, the smaller size of the clearance may cause an overflow of the adhesive agent 54 out of such clearance, causing unwanted adhesion of the adhesive agent 54 on the lens 32 of the glass containing lens 50 or on the end surface 3a mated with the optical connector 4 (see FIG. 1), partially blocking the optical path.

Second Embodiment

Figure 4A:
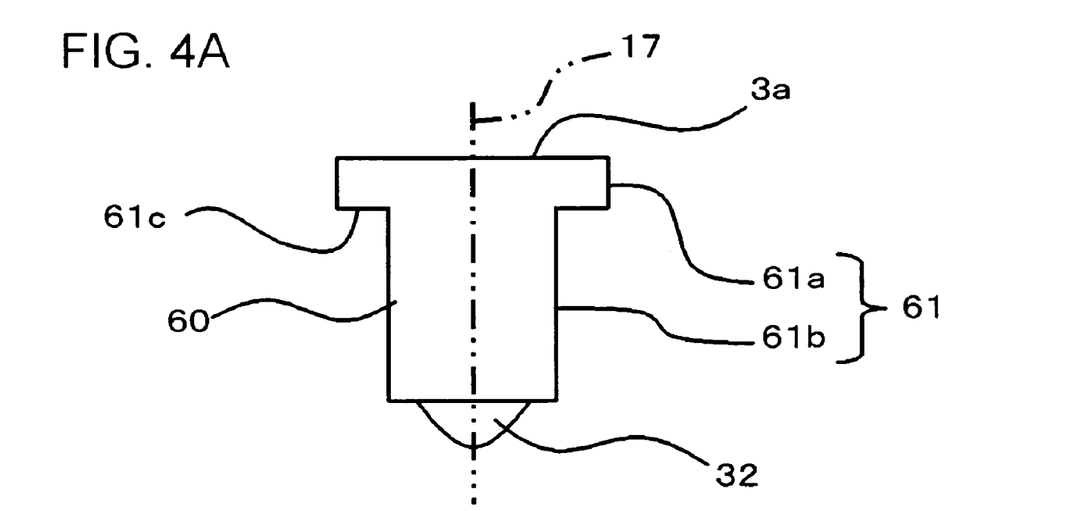
FIG. 4A is a front view of a glass containing lens of the optical module according to a second embodiment.
Figure 4B:
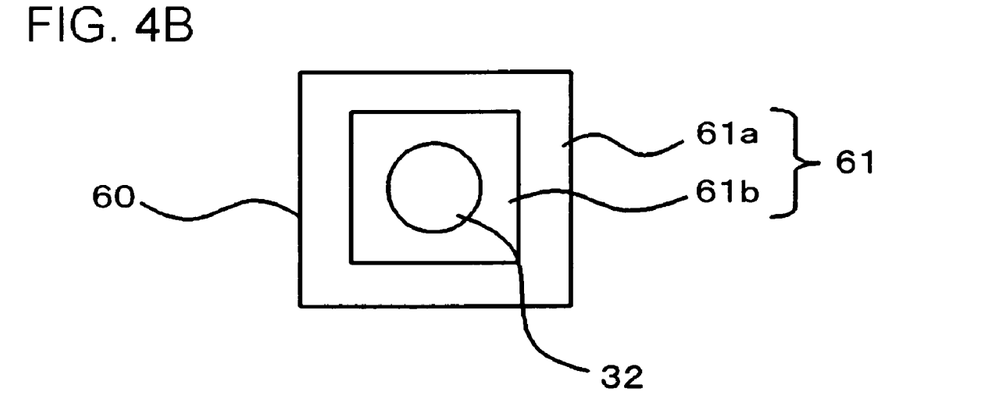
FIG. 4B is a bottom view thereof.

FIG. 4A is a front view of a glass containing lens of the optical module according to the embodiment, and FIG. 4B is a bottom view thereof (diagram for showing the whole module is not presented).

An optical module according to the present embodiment has similar configuration as employed in the optical module 1 of first embodiment, except that the optical module includes a glass containing lens 60 of FIG. 4A in place of the glass containing lens 3 of the optical module 1 according to the above-described first embodiment. Further, the fixing section 12 of the optical module according to the present embodiment is formed to be a square pole in accordance with the shape of the glass containing lens 60. The optical module according to the present embodiment is configured to have similar configuration as the optical module 1 according to the above-described first embodiment in other aspects.

As shown in FIGS. 4A and 4B, the glass containing lens 60 includes a main body 61 and the lens 32. This main body 61 includes a first section 61a and a second section 61b. The first section 61a has an outer diameter, which is substantially equivalent to the inner diameter of the fixing section 12. The second section 61b has an outer diameter, which is smaller than the outer diameter of the first section 61a, and leastwise includes an end section of the main body 61 in the side of the device-installing section 13 (see FIG. 1). The outer diameter of the first section 61a is a diameter of a circumcircle of the first section 61a when seeing the first section 61a in the direction of FIG. 4B. Similarly, the outer diameter of the second section 61b is a diameter of a circumcircle of the second section 61b when seeing the second section 61b in the direction of FIG. 4B.

In the present embodiment, the outer diameter of the glass containing lens 60 is discontinuously changed in the step 61c located in a boundary between the first section 61a and the second section 61b. In case of the present embodiment, the first section 61a is an end section of the glass containing lens 60 in the side of the optical connector-inserting section 11 (see FIG. 1).

More specifically, for example, the first section 61a of the glass containing lens 60 is composed of polygonal column (for example, square column) having relatively larger diameter or transverse dimension, the second section 61b is composed of polygonal column (for example, square column) having relatively smaller diameter or transverse dimension.

Since the manner for fixing the glass containing lens 60 to the fixing section 12 is similar to that employed in the above-described first embodiment, description thereof is not presented.

According to second embodiment as described above, similar advantageous effects as obtained in the above-described first embodiment can also be obtained. The polygonal column shapes of the first and the second sections 61a and 61b prevent a rotation of the glass containing lens 60 around the central axis 17 of the glass containing lens 60 within the fixing section 12, a misalignment of glass containing lens 60 in the fixing section 12 can be more preferably inhibited, as compared in the above-described first embodiment.

While the exemplary implementation, in which the first section is the end section of the glass containing lens 3 in the side of the optical connector-inserting section 11, has been described in the above-described respective embodiments, the first section may be located to be closer to the optical connector-inserting section 11 than the second section, and may alternatively be located to be closer to the device-installing section 13 than the end section of the glass containing lens 3 in the side of the optical connector-inserting section 11.

While the exemplary implementations, in which the inner diameter of the fixing section 12 is larger than the inner diameter of the optical connector-inserting section 11, and the receptacle 2 includes the stepwise surface 14 in the side thereof facing the fixing section 12 in the boundary between the optical connector-inserting section 11 and the fixing section 12, and the end surface 3a of the glass containing lens is mated with the stepwise surface 14, has been described above, the inner diameter of the fixing section 12 may not be larger than the inner diameter of the optical connector-inserting section 11, and the receptacle 2 may not include the stepwise surface 14 in the side thereof facing the fixing section 12 in the boundary between the optical connector-inserting section 11 and the fixing section 12. An example of such structure may be, for example, a configuration, in which the diameter of the fixing section 12 is equivalent to the diameter of the optical connector-inserting section 11, similarly as in the structure of FIG. 9.

While the exemplary implementations employing the receptacle 2 composed of a resin have been described above, the receptacle 2 may be composed of other material (for example, a metal).

While the exemplary implementation of first embodiment, in which the shape of the main body 31 is like a partial circular cone, in which the top of a circular cone is cut along the surface that is parallel to the bottom surface of the circular cone to be removed, has been described above, the shape of the main body 31 may alternatively be like a partial polygonal cone, in which the top of a polygonal cone is cut along the surface that is parallel to the bottom surface of the polygonal cone to be removed.

Figure 10A:
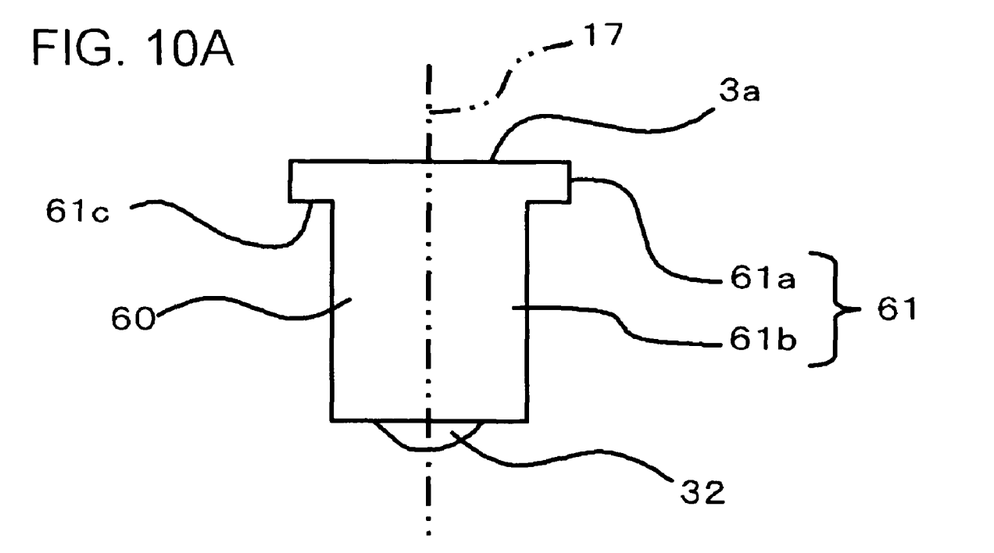
FIG. 10A is a front view of a glass containing lens of the optical module according to a modification of the second embodiment.
Figure 10B:
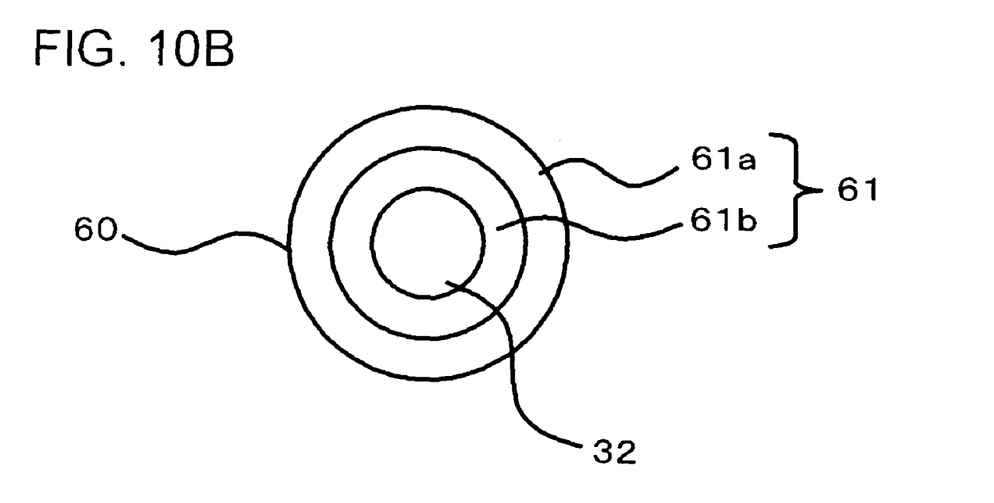
FIG. 10B is a bottom view thereof.

While the exemplary implementation of second embodiment, in which the first and the second sections 61a and 61b are polygonal column shapes, has been described above, the first and the second sections 61a and 61b may alternatively be cylinder shapes as shown in FIGS. 10A and 10B. Alternatively, one of the first and the second sections 61a and 61b may be polygonal column shape, and the other may be cylindrical shape. Further, while the exemplary implementation, in which the diameter of main body 61 changes in two steps, has been described in second embodiment, the diameter of the main body 61 may alternatively change in three or more steps.

While the exemplary implementation employing the lens-containing optically-transmissive member made of glass (glass containing lens 3) has been described above, the lens-containing optically-transmissive member may alternatively be composed of other material (for example, optically-transmissive resin). In addition to above, since the temperature dependency in the refractive index of glass is generally smaller than that of resins, the lens-containing optically-transmissive member may be preferably composed of a glass. Preferable range of the refractive index of the lens-containing optically-transmissive member may be, for example, within a range of from 1.36 to 1.56, provided that the refractive index of an optical fiber 1.46.

It is apparent that the present invention is not limited to the above embodiment, and may be modified and changed without departing from the scope and spirit of the invention.

What is claimed is:

1. An optical module, comprising:
   a lens-containing optically-transmissive member; and
   a receptacle,
   wherein said receptacle includes:
   an optical connector-inserting section for inserting an optical connector;
   a fixing section for fixing the lens-containing optically-transmissive member, in which said lens-containing optically-transmissive member is fixed; and
   an device-installing section for installing a semiconductor device serving as a light emitting device or a light receiving device;
   said optical connector-inserting section, said fixing section and said device-installing section being coaxially arranged in this sequence,
   wherein said fixing section communicates with said device-installing section,
   wherein said lens-containing optically-transmissive member includes a main body and a lens provided in one end of said main body, and
   wherein said main body of said lens-containing optically-transmissive member includes a first section and a second section, said first section having a first outer diameter, which is substantially equal to a first internal diameter of said fixing section, and said second section having a second outer diameter, which is smaller than said first outer diameter, and at least containing an end of said main body in a side of said device-installing section.

2. The optical module according to claim 1, wherein said lens-containing optically-transmissive member is tapered, having gradually decreased outer diameter from said first section to said second section.

3. The optical module according to claim 1, wherein said lens-containing optically-transmissive member has discontinuously changed outer diameter, which changes in a stepped section located in a boundary zone between said first section and said second section.

4. The optical module according to claim 1, wherein said first sections is an end of said lens-containing optically-transmissive member in the side of said optical connector-inserting section.

5. The optical module according to claim 1,
   wherein said first internal diameter is larger than a second internal diameter of said optical connector-inserting section,
   wherein said receptacle has a stepwise surface facing the side of said fixing section in a boundary between said fixing section and said optical connector-inserting section, and
   wherein one end of said lens-containing optically-transmissive member contacts with said stepwise surface.

6. The optical module according to claim 1, wherein said lens-containing optically-transmissive member is fixed by adhering to said fixing section with an adhesive agent.

7. The optical module according to claim 1, wherein said receptacle is composed of a resin.

8. A process for manufacturing an optical module, comprising, in this sequence:
   inserting said lens-containing optically-transmissive member of said optical module according to claim 1 in said fixing section; and
   fixing said lens-containing optically-transmissive member by adhering to said fixing section with an adhesive agent.

* * * * *